May 13, 1969 J. WALTON 3,444,335

PHONOGRAPH PICK-UP WITH DE-COUPLING OF THE STYLUS MASS

Filed Jan. 4, 1965

INVENTOR
JOHN WALTON
BY: Mawhinney & Mawhinney
ATTYS.

United States Patent Office 3,444,335

Patented May 13, 1969

3,444,335

PHONOGRAPH PICK-UP WITH DE-COUPLING OF THE STYLUS MASS

John Walton, 19 New End, London NW. 3, England

Filed Jan. 4, 1965, Ser. No. 423,026
Int. Cl. H04r *1/16;* G11b *3/00*
U.S. Cl. 179—100.41 1 Claim

ABSTRACT OF THE DISCLOSURE

A phonograph pick-up comprising a transducer, a stylus in a removable stylus carrier and transmission means for transmitting movement of the stylus to the transducer, the stylus carrier being located in or engaging said transmission means and said stylus carrier extending traversely to the direction of motion of the stylus to be transmitted is characterized in that the stylus carrier is flexible between the stylus and a part of the stylus carrier shaped to engage said transmission means, the flexibility providing compliance and damping between the stylus and the transmission means in the direction of motion of the stylus so as to partially decouple the stylus from the transmission means and thereby to reduce the effective mass at the stylus tip, the compliance being determined in accordance with the de-coupled mass to give a transmission characteristic which is a periodic over a limited frequency range or has a resonance, damped by said damping, at a frequency near or above the upper end of the audio frequency range.

Phonograph pick-ups basically perform the function of producing electrical signals corresponding to the form of the record groove.

It is generally recognised that, in high quality phonographs, the most serious imperfection in the pick-up performance is the production of harmonic distortion. Most of this harmonic distortion arises because the pick-up stylus does not exactly follow the modulation of the record groove and there are two main reasons for this: one is geometrical in that the reproducing stylus is a different shape from the cutting stylus, producing what is known as "tracing distortion" and the other is dynamic in that the reproducing stylus unevenly deforms the record groove due to the stiffness and mechanical resistance. Finally, inertia of the stylus system acting on the spherical stylus tip produces what is called "stylus mass distortion." I have shown in my paper in J. Audio Eng. Soc. 11,104 (1963) that stylus inertia is the largest single cause of distortion in the reproduction of phonograph records. If the stylus mass can be reduced, there is less distortion and less record wear. I have shown also in the above-mentioned paper that, if the stylus mass can be reduced to such an extent that the pick-up can track the recorded groove "oscillations" without plastic deformation of the groove walls so that the pick-up tracks within the elastic limits of the record material, then not only does record wear disappear completely (groove "fatigue" will not be significant until many tens of thousands of playing of a record) but also there is a very large improvement in the reproduced sound.

Whilst it has been generally recognized that reduction of the stylus mass is desirable, the current techniques in miniaturization lead to increased cost of pick-ups and there is a limit to miniaturization where the expense of manufacture becomes disproportionate; this limit appears to be such that the elastic limit of the record material is still exceeded when playing a record.

It is one of the objects of the present invention to provide a construction of pick-up enabling the effective mass at the stylus tip to be so reduced that the pick-up can track within the elastic limits of the record materials (polyvinyl acetate, polyvinyl chloride copolymers) commonly used at the present time.

It is a further object of the invention to enable such a construction to be achieved very economically so that cheap pick-ups can be constructed having a performance superior to most of the expensive precision micro-engineered pick-ups at present available.

The pick-up of the present invention conveniently makes use of a jewel type of stylus. The stylus may in the known manner be a small piece of hard material such as sapphire or diamond which sits in the record groove. This is usually formed as a rod having a cylindrical or square section, one end being formed as a cone with a polished spherical termination which makes contact with the walls of the record groove; such a rod when of circular section, can be produced by a process known as "rondelling" and this item as a product of the lapidiary's art, is known as a rondel. For the present purpose this device need not be of circular section and alternatively a small jewel chip can be fixed to a metal shank, the chip and shank then being ground and lapped to form a cone with the polished spherical jewel as the tip. It will be appreciated that the rondel is a very small device having a weight in the region of 1 milligram and a length usually appreciably less than one tenth of an inch. In the following description the expression "rondel" will be used to include all these types of construction.

According to this invention, a phonograph pick-up comprises a stylus, a transducer arranged to produce an electrical output in response to movement of a part of said transducer and transmission means for transmitting movement of the stylus to the movable part of the transducer, which transmission means are flexible in the direction of the motion to be transmitted to partially de-couple the stylus from the transducer, the transmission means having a compliance as close as possible to the rondel to reduce the effective mass at the stylus tip. Preferably the compliance is between the rondel and its support so that the rondel is de-coupled from the remainder of the transmission means. The compliance furthermore may be determined in accordance with the mass of the stylus and the de-coupled part of the transmission means to give a resonance at or towards or above the high frequency end of the audio frequency range; such a resonance would give zero effective tip mass at the resonant frequency and by choice of this frequency and of the damping the effective tip mass in the upper part of the audio frequency band, where the effect of tip mass is most significant, can be reduced to any practically desired proportion.

The transmission means typically includes a stylus arm extending from the rondel to the transducer. This stylus arm may be formed of a resilient plastic material incorporating, if necessary, a suitable filler to introduce mechanical resistance; the term flexible is used in this specification to describe an element having compliance and which may have mechanical resistance. The magnitude of the compliance together with that of the relevant mass in the system determines the resonant frequency of a mechanically oscillatory system; the resistance however controls the sharpness of the resonant characteristic, i.e. the frequency spread of the amplitude-frequency and impedance-frequency characteristic.

Before further explaining the pick-up of the present invention, it is convenient to refer in further detail to the current practice in this art. Heretofore, in electromagnetic pick-ups, it has been the practice to mount a rondel as rigidly as possible into a stylus arm which is itself rigid at least in the direction of the motion to be transmitted and which in turn is rigidly coupled to an armature. To minimize the effective mass, the assembly is kept as small as possible and the rondel may be mounted directly in the armature. The armature must be free to move in correspondence with the movements of the stylus in the record groove and hence the stylus arm between the armature and a fixed part of the pick-up structure must have compliance. In such a construction, the armature, by being rigidly coupled to the rondel, faithfully follows the movements of the rondel. Any compliance between the rondel and armature has been regarded as undesirable and pick-up designers have aimed to avoid any such compliance as far as possible. With such a rigid coupling between the armature and the rondel, the effective mass at the stylus tip is dependent on the effective mass of the rondel and the summation of the effective masses of the armature and any associated part of the transmission means between the rondel and armature together.

In piezo-electric pick-ups, on the other hand, a compliant transmission member has generally been employed between the stylus arm and the piezo-electric element so that the compliance of the pick-up is not limited by the very small compliance of the piezo-electric element.

However, in order to avoid any dip or resonance in the amplitude-frequency characteristic of the pick-up within the audio frequency band, the stylus arm itself has been kept as rigid as possible.

I have appreciated, however, that if compliance is introduced near the rondel, the effective stylus tip mass is reduced, the mass of the stylus arm, or at least part thereof, being de-coupled from the rondel. Hence not only is the effective tip mass of the stylus reduced but also the problems of trying to reduce the mass of the stylus arm without making it too fragile are overcome. I have also appreciated that, by making the transmission means flexible, with both compliance and resistance (which is readily achieved by using a resilient plastic material with a suitable filler), the effective stylus mass is reduced not only at the mechanical resonance frequency which is at the high frequency end of the audio range but also is partially reduced at lower frequencies. The stylus inertia causes most distortion at the highest frequencies to be reproduced since it is at the higher frequencies that the greater accelerations of the stylus are encountered at the same time as the smallest amplitudes which are most readily distorted or erased. By making the damping sufficient, it is no longer essential to have the mechanical resonance frequency above the audio range although it would preferably be near or just above the upper end of the audio band. It is thus possible by the use of flexible transmission means to obtain a substantial reduction of distortion due to stylus inertia.

Thus in a preferred construction, the stylus arm is made flexible and also compliance is introduced in the transmission path as near as possible to the rondel. This compliance must be compliance in the direction of the motion to be transmitted; in other directions, the compliance is determined by other considerations. Preferably the rondel is flexibly mounted in the stylus arm. One way of achieving this is to provide a stylus carrier on the end of the stylus arm. Such a stylus carrier may be formed of a resilient plastic material such as polyethylene and may be shaped to have a portion which resiliently grips or is resiliently gripped by a complementary shaped portion on the end of the stylus arm which arm may be made for example of polyvinyl chloride. The polyethylene, although less compliant than the polyvinyl chloride, is less dense and hence enables a lighter weight stylus carrier to be provided. The main reason however for using polyethylene is that a rondel can be inserted into polyethylene deforming it beyond the elastic limit so that the rondel can be flexibly held in the carrier whereas, if a rondel is forced into polyvinyl chloride, it normally compresses the latter forming a mass around the rondel which essentially moves with the rondel. Thus the use of polyethylene enables flexibility to be introduced between the rondel and the stylus carrier. This use of a separate stylus carrier is also advantageous in that the stylus and stylus carrier can be constructed to be readily removable from the end of the stylus arm.

As previously indicated, preferably the stylus arm is made flexible. By providing distributed decoupling along the length of the arm, a resonance free performance in the audio frequency band can be obtained. Conveniently the stylus arm is moulded integrally with the body of the pick-up. In the case of an electromagnetic pick-up a coil or coils of the transducer may be housed in the body of the pick-up and arranged to co-operate with an armature constituted by ferro-magnetic particles embedded in the resilient plastic material forming the stylus arm. Alternatively a suitable slug of ferro-magnetic material or a coil or other sensing element may be arranged in the stylus arm.

The following is a description of two embodiments of the invention, reference being made to the accompanying drawings in which.

Figures 1, 2, 3, 4, 5, 6, 7, 8:
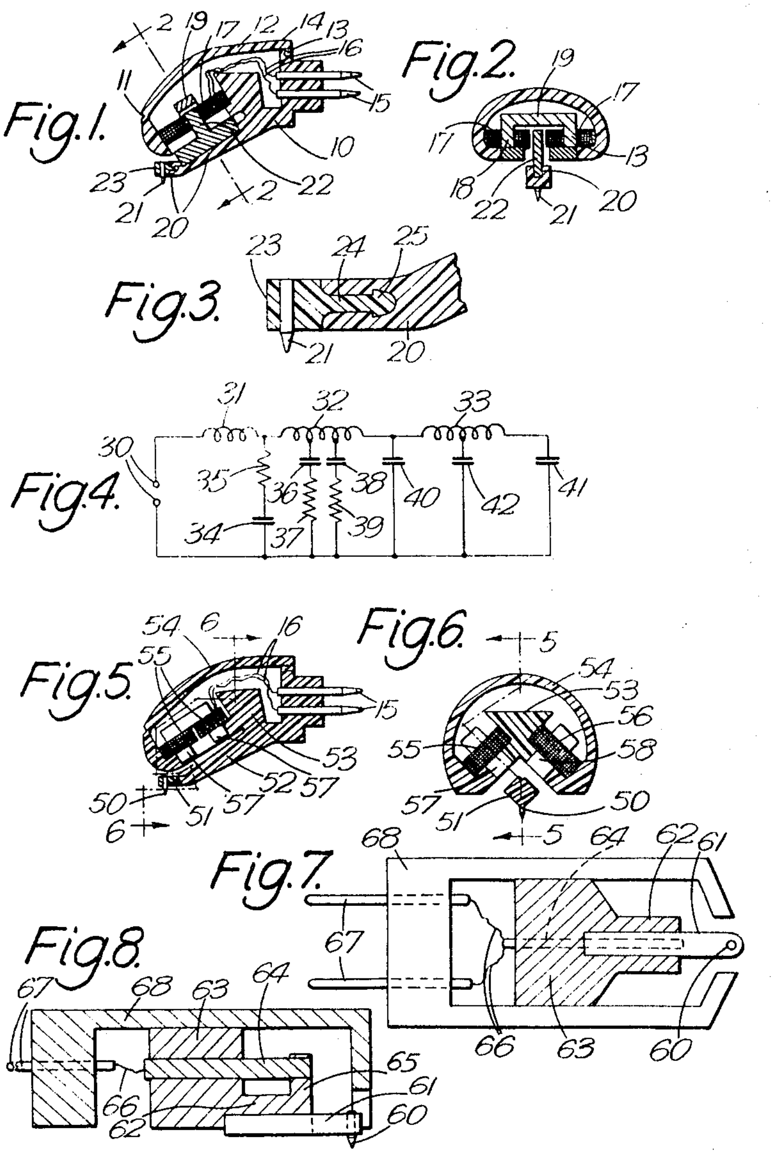
FIGURE 1 is a longitudinal schematic section through a phonograph pick-up for reproduction from a lateral cut recording.
FIGURE 2 is a transverse section along the line 2—2 of FIGURE 1.
FIGURE 3 is an enlarged view illustrating a detail of the construction of FIGURES 1 and 2.
FIGURE 4 is an explanatory diagram showing an electrical analogue of the mechanical transmission means employed in the pick-up of FIGURES 1 to 3.
FIGURE 5 is a longitudinal schematic section along the line 5—5 of FIGURE 6 showing a phonograph pick-up which is a modification of the arrangement of FIGURES 1 to 3 adapted for stereophonic reproduction.
FIGURE 6 is a transverse section along the line 6—6 of FIGURE 5.
FIGURES 7 and 8 are respectively an underside plan and a sectional elevation of a phonograph pick-up of the piezo-electric type.

Referring to FIGURES 1 to 3, the pick-up body comprises a moulding 10 of polyvinyl chloride. This moulding is shaped to have a thin portion 11 forming a hinge so that a top portion 12 may be bent over to form a top cover. The cover is held in the closed position by having a rim 13 with a projection engaging under a lip 14 on the main part of the body portion. Embedded in the main body portion 10 are pins 15 to form a connecting plug, these pins being connected by wires 16 to two coils 17 around two pole pieces 18 of a ferro-magnetic core forming part of a permanent magnet 19. Integrally formed with the moulding 10 is an arm 20 which protrudes forwardly on the underside of the main portion of the body. This arm 20 carries a rondel 21 forming a stylus for engaging the record groove and will be referred to hereinafter as the stylus arm. Embedded in this arm is a slug 22 of ferro-magnetic material, the slug forming an armature adjacent the inwardly protruding ends of the two pole pieces 18. The rondel 21 is carried on the end of the arm 20 by means of a stylus carrier 23 which is illustrated to a larger scale in FIGURE 3. This stylus carrier is moulded of polyethylene. In the embodiment illustrated, the rondel is a one piece jewel rondel but it might equally well be a suitably shaped jewel chip mounted on a metal shank. Typically the rondel might have a diameter of 0.015 inch, a length of 0.075 inch and a weight in the region of one milligram. The rondel is forced into the polyethylene deforming the latter beyond its elastic limit. The polyethylene, when so deformed, flows away from the region of the rondel and is not compressed into a denser material as would be the case with polyvinyl chloride. As a result, the rondel is flexibly held in the stylus carrier with compliance between the rondel and the carrier. The carrier itself is of less dense material than the polyvinyl chloride of the stylus arm and also introduces further compliance between the rondel and the stylus arm.

The stylus carrier 23 has a male portion 24 with a head 25 which is resiliently gripped in a mating socket on the end of the arm 20 so that the rondel and stylus carrier form a readily removable unit. Other constructions for removably mounting the stylus carrier on the end of the stylus arm will be readily apparent.

Before explaining further the details of construction of the pick-up of FIGURES 1 to 3, reference will be made to FIGURE 4 which is an electrical analogue. It is convenient to explain the operation of mechanical transmission system using an electrical analogue in which inductance corresponds to mass, capacitance corresponds to compliance and resistance corresponds to mechanical resistance or damping. In FIGURE 4, the input terminals 30 represent the input to the mechanical transmission system as seen by the record groove. The inductance 31 corresponds to the mass of the rondel, the inductance 32 corresponds to the mass of the stylus carrier and stylus arm and the inductance 33 corresponds to the mass of the movable part of the transducer, namely the armature 22. There is flexibility between the rondel and the carrier and this is indicated by the capacitance 34 and resistance 35. The stylus carrier and stylus arm have a distributed flexibility represented by the capacitance 36 and resistance 37 and by the capacitance 38 and resistance 39. There may be some compliance between the movable part of the transducer and the stylus arm, represented by the capacitance 40. There is compliance between the transducer and the fixed part of the body as indicated by the capacitance 41. The movable part of the transducer itself may have some compliance as indicated at 42 if, instead of using a slug 22 of ferro-magnetic material, the armature was formed by ferro-magnetic particles distributed in the plastic material of the stylus arm or as in the case of a crystal or ceramic element in a piezo-electric pick-up.

The elements 31, 34, 35 form a damped resonant system. In the absence of damping, at the resonant frequency, there would be zero input impedance as seen at the terminals 30; in other words, the effective mass of the stylus tip, as seen by the groove walls, would be zero and such a frequency would not be transmitted to the transducer. In the absence of damping, this mechanical resonance must be above the required audio frequency band. By introducing damping however, this restriction is no longer necessary although the resonant frequency in practice is made near or above the audio frequency band. With damping, the impedance of the stylus is not reduced to zero but it is readily possible to reduce it, particularly for higher frequency part of the audio band (where its effect is most considerable) to a very small value such that the forces of the stylus on the groove walls of the record apply stresses below the elastic limit of the record material. It will be appreciated that the amplitude of motion at very high accelerations are very minute compared with the amplitudes of the movement for which compliance is provided and are thus more easily distorted. As previously explained, provided the effective tip mass can be reduced to such a level, the distortion in the reproduction is very considerably reduced and record wear can be eliminated. Whereas with commercial pick-ups prior to my invention, serious record wear is produced at the first playing of a record, with the arrangement of the present invention, a pick-up can readily be constructed which gives negligible wear after tens of thousands of playings of a record.

The use of the polyethylene material for the stylus carrier introduces the flexibility 34, 35 but also enables a light weight stylus carrier to be made. The use of this separate stylus carrier also enables the stylus and stylus carrier to be formed as a readily removable unit which can be replaced when the stylus is worn.

The distributed flexibility of the stylus carrier and stylus arm further de-couples the rondel from the transducer and from part of the stylus arm. By having a distributed de-coupling, resonance in the audio frequency spectrum can be avoided.

In a typical case, the effective tip mass in the construction described above might be 0.5 milligram and it could quite readily be made as low as 0.2 milligram. These values may be compared with the effective mass of several milligrams given by high quality commercial pick-ups at the present time. The effective tip mass is reduced by an order of magnitude and this reduction reduces the inertia forces of the stylus on the groove walls below the elastic limit of conventional types of record material.

The rondel in FIGURE 3 is of conventional elongated shape. Its moment of inertia and hence its effective mass at the tip will depend on its instantaneous centre of rotation. The imparting of a high acceleration to the tip will tend to cause the rondel to turn about its centre of gravity whereas low accelerations, with their larger amplitudes, will tend to cause it to move according to its restriction by the stylus carrier and stylus arm. In this latter case, the rondel will tend to move as a whole or at least with its instantaneous centre of rotation above its centre of gravity with the construction illustrated. The de-coupled rondel, for this reason, offers a lower effective tip mass to high accelerations than to lower ones, as is desirable. The plastic material of the stylus carrier and stylus arm may soften as the temperature rises so giving a lower effective tip mass at higher temperatures. This may also be advantageous since the record material will also tend to soften at higher temperatures and a lower effective tip mass may be necessary if the elastic limits of the record material are not to be exceeded.

It will be noted more generally that, apart from the stylus in its stylus carrier, the whole pick-up may be formed as a one piece moulding of plastic material around the transducer and connecting leads. This considerably simplifies the manufacture of the pick-up compared with conventional constructions in which usually numerous components have to be assembled together in a rigid housing.

FIGURES 5 and 6 illustrate a modification of the construction of FIGURES 1 to 3 arranged for reproduction from stereophonic recordings of the kind in which the two sets of sound signals are represented by displacements of the stylus in two orthogonal directions considered in a plane normal to the direction of the groove. In FIGURES 5 and 6 the stylus is shown at 50 and is carried by a stylus carrier 51 on the end of an arm 52 which is integrally moulded with a body portion 53 having a hinged cover 54 as in the arrangement of FIGURES 1 to 3. The body carries two separate electromagnetic systems each having separate pairs of coils 55, 56 on permanent magnet cores having pole pieces 57, 58. Two co-operating armatures might be provided on the arm 52 in a similar manner to the armature 22 of FIGURES 1 and 2; in the construction illustrated in FIGURES 5 and 6, the polyvinyl chloride material of the arm 52, at least in the region adjacent the pole pieces 57, 58 is loaded with particles of ferro-magnetic material so that the arm 52 forms the two movable armatures of electro-magnetic systems. In such a stereophonic pickup, three pins 15 with connecting wires 16 are required to provide connections to the two pairs of coils. Apart from the features referred to above, the construction of FIGURES 5 and 6 may be similar to that of FIGURES 1 to 3. It operates in a similar manner to give the reduced effective tip mass and hence the reduced distortion and record wear. In the stereophonic pick-up, the flexibility between the rondel and stylus carrier and in the stylus carrier and stylus arm must be, for the present invention, flexibility in the directions of the motion to be transmitted to each of the transducers.

FIGURES 7 and 8 illustrate a piezo-electric phonograph pick-up embodying the invention. A rondel 60 is carried in the end of a flexible stylus arm 61 which may be formed of polyethylene. This arm 61 is removable from the pick-up, being resiliently gripped in a groove on the underside of a portion 62 projecting from a resilient plastic element 63, conveniently moulded of polyvinyl chloride. This element 63 forms a main body of the pick-up supporting a piezo-electric element 64 comprising a strip of piezo-electric material forming a "bender" element. About half the length of the piezo-electric element 64 is firmly held in the body 63 and the free end of the piezo-electric element 64 engages in a transmission element 65 formd integrally with the body 63 on the end of the portion 62. Electrodes on the piezo-electric element 64 are connected by wires 66 to two pins 67 moulded into a cover 68 which fits over and holds the body 63.

It will be seen that the rondel 60 is de-coupled from the stylus arm 61 in exactly the same way as in FIGURES 1 to 3. The stylus arm 61 is flexible and the motion of the stylus is transmitted to the piezo-electric element by the flexible transmission element 65. Thus the electrical analogue of the pick-up of FIGURES 7 and 8 is similar to FIGURE 4. The rondel 60 is de-coupled from the transmission element 65 to give the reduction of effective tip mass and hence the reduction of record wear and distortion as explained with reference to the previously described embodiments of the invention.

The pick-up of FIGURES 7 and 8 may be modified for reproducing stereophonic records by providing two separate piezo-electric elements with separate transmission means (corresponding to the element 65) for transmitting the appropriate components of motion to the respective piezo-electric elements.

I claim:

1. A phonograph pick-up comprising a main body portion formed of resilient plastic material and having moulded integrally therewith an elongated stylus arm extending from said main body portion, a transducer having a fixed part carried in said main body portion and having a movable part carried by said arm intermediate the ends thereof, a stylus, a stylus carrier in which said stylus is flexibly carried, said stylus carrier being formed of a resilient plastic material which is less dense than the material of said arm and extending in a direction at right angles to the movement of the stylus, said stylus carrier being carried on the end of said stylus arm, the stylus carrier and stylus arm having complementary shaped portions whereby the stylus carrier is resiliently secured to the end ot said arm but is removable therefrom, the stylus carrier and stylus arm both being flexible in the direction of the motion of the stylus to be transmitted to said transducer and having compliance to partially de-couple the stylus from the transducer, the compliance being such as to give a mechanical resonance frequency of the stylus above the audio frequency range whereby the effective mass at the stylus tip is substantially less than the actual mass of the stylus.

References Cited

UNITED STATES PATENTS

| | | | |
|---|---|---|---|
| 3,075,054 | 1/1963 | Cvetko | 179—100.41 |
| 2,373,181 | 4/1945 | Fleming | 179—100.41 |
| 2,868,892 | 1/1959 | Keohane | 179—100.41 |
| 2,955,170 | 10/1960 | Dieter et al. | 179—100.41 |
| 3,040,136 | 6/1962 | Grado | 179—100.41 |
| 3,043,921 | 7/1962 | Hester | 179—100.41 |
| 3,196,216 | 6/1965 | Davis | 179—100.41 |
| 3,236,956 | 2/1966 | Kantrowitz | 179—100.41 |
| 3,268,231 | 8/1966 | Hunt | 274—37 X |
| 3,327,069 | 6/1967 | White | 179—100.41 |

FOREIGN PATENTS

| | | |
|---|---|---|
| 942,532 | 11/1963 | Great Britain. |

OTHER REFERENCES

Bauer: On Damping of Phonograph Styli, J. Audio Eng. Soc., 12, pp. 210–213, July 1964.

BERNARD KONICK, *Primary Examiner.*

R. F. CARDILLO, Jr., *Assistant Examiner.*

U.S. Cl. X.R.

274—37